US009415661B2

(12) United States Patent
Koch

(10) Patent No.: US 9,415,661 B2
(45) Date of Patent: Aug. 16, 2016

(54) CONTROL ELEMENT OF A VEHICLE VENTILATION AND/OR AIR CONDITIONING UNIT, CONTROL ASSEMBLY AND VEHICLE VENTILATION AND/OR AIR CONDITIONING UNIT

(71) Applicant: Valeo Klimasysteme GMBH, Bad Rodach (DE)

(72) Inventor: Peter Koch, Rodach (DE)

(73) Assignee: VALEO KLIMASYSTEME GMBH, Bad Rodach (DE)

(*) Notice: Subject to any disclaimer, the term of this patent is extended or adjusted under 35 U.S.C. 154(b) by 0 days.

(21) Appl. No.: 14/394,384

(22) PCT Filed: Apr. 17, 2013

(86) PCT No.: PCT/EP2013/057967
§ 371 (c)(1),
(2) Date: Oct. 14, 2014

(87) PCT Pub. No.: WO2013/156508
PCT Pub. Date: Oct. 24, 2013

(65) Prior Publication Data
US 2015/0090069 A1    Apr. 2, 2015

(30) Foreign Application Priority Data

Apr. 18, 2012  (DE) .......................... 10 2012 007 745

(51) Int. Cl.
*F16H 53/00*  (2006.01)
*B60H 1/00*  (2006.01)

(52) U.S. Cl.
CPC .......... *B60H 1/0065* (2013.01); *B60H 1/00857* (2013.01); *F16H 53/00* (2013.01); *Y10T 74/2101* (2015.01)

(58) Field of Classification Search
CPC .. B60H 1/0065; B60H 1/00857; F16H 53/02; F16H 53/06; F16H 53/00; Y10T 74/2101; Y10T 74/2107

USPC ................................ 74/10.29, 10.6, 567, 569
See application file for complete search history.

(56) References Cited

U.S. PATENT DOCUMENTS

| 12,980 | A | * | 5/1855 | Wilson | .................... F16H 53/06 74/569 |
| 3,869,924 | A | * | 3/1975 | Beezer | .................... F16H 37/16 74/24 |

(Continued)

FOREIGN PATENT DOCUMENTS

| DE | 19749214 C1 * | 10/1998 | .......... B60H 1/0065 |
| DE | 101 27 650 A1 | 12/2002 | |

(Continued)

OTHER PUBLICATIONS

International Search Report for Application No. PCT/EP2013/057967 dated Jul. 11, 2013, 3 pages.

(Continued)

*Primary Examiner* — Adam D Rogers
(74) *Attorney, Agent, or Firm* — Howard & Howard Attorneys PLLC

(57) ABSTRACT

A control element of a vehicle ventilation and/or air conditioning unit, in particular for controlling air distribution flaps, has a rotational axis and a circumferential surface encircling around the rotational axis. On the encircling circumferential surface the control element has at least one guiding rib which protrudes in the radial direction in relation to the circumferential surface. The guiding rib divides the control element into an axially front region and an axially rear region. A control assembly of at least one air distribution flap of a vehicle ventilation and/or air conditioning unit comprises a control element of this type and an output element which is coupled to the guiding rib of the control element.

13 Claims, 3 Drawing Sheets

(56) References Cited

U.S. PATENT DOCUMENTS

| | | | | |
|---|---|---|---|---|
| 4,656,926 A | * | 4/1987 | Bauer | B60H 1/0065 251/248 |
| 4,979,406 A | * | 12/1990 | Waller | B23Q 27/006 74/567 |
| 5,243,869 A | * | 9/1993 | Kukowski | F16H 27/045 74/567 |

FOREIGN PATENT DOCUMENTS

| | | |
|---|---|---|
| DE | 102 26 132 A1 | 1/2004 |
| EP | 1 486 361 A1 | 12/2004 |
| FR | 2905088 A1 * 2/2008 | B60H 1/0065 |
| GB | 1297491 A * 11/1972 | B65H 54/2809 |
| GB | 1575725 A * 9/1980 | B21F 1/00 |

OTHER PUBLICATIONS

English language abstract and machine-assisted English translation for DE 101 27 650 extracted from espacenet.com database on Oct. 27, 2014, 11 pages.

Machine-assisted English language abstract and machine-assisted English translation for DE 102 26 132 extracted from espacenet.com database on Oct. 27, 2014, 21 pages.

* cited by examiner

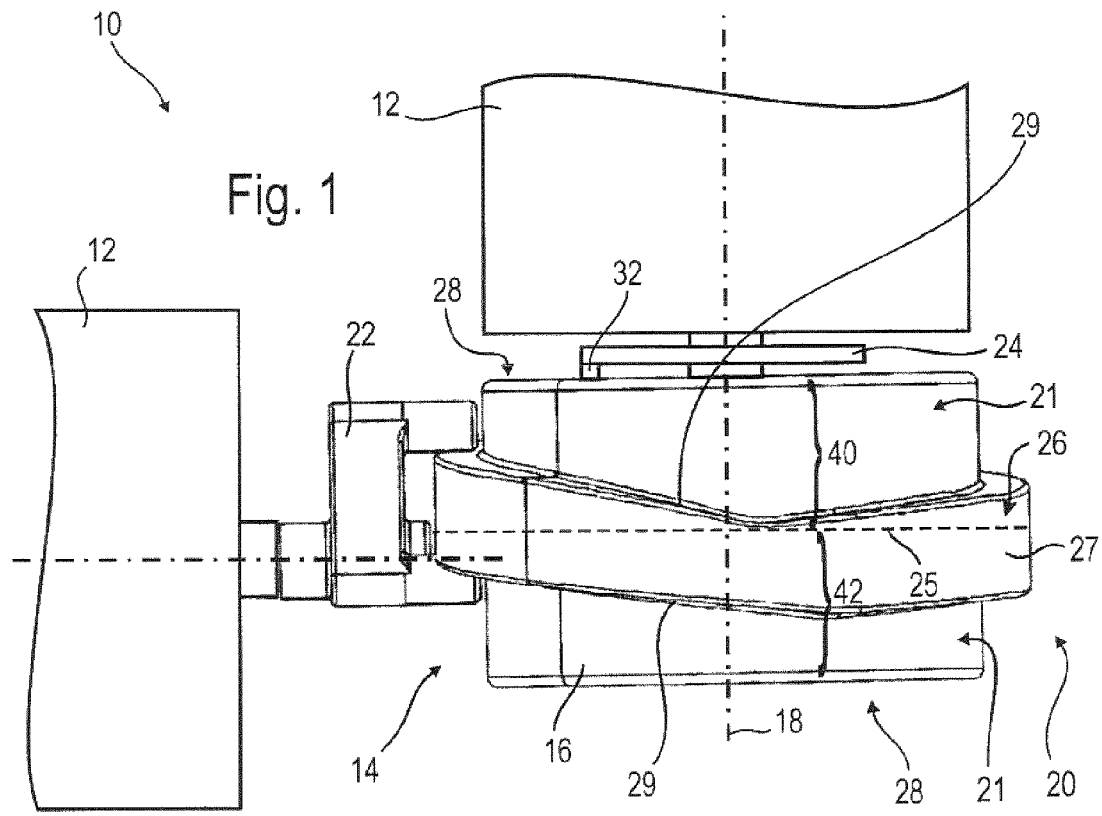
Fig. 1
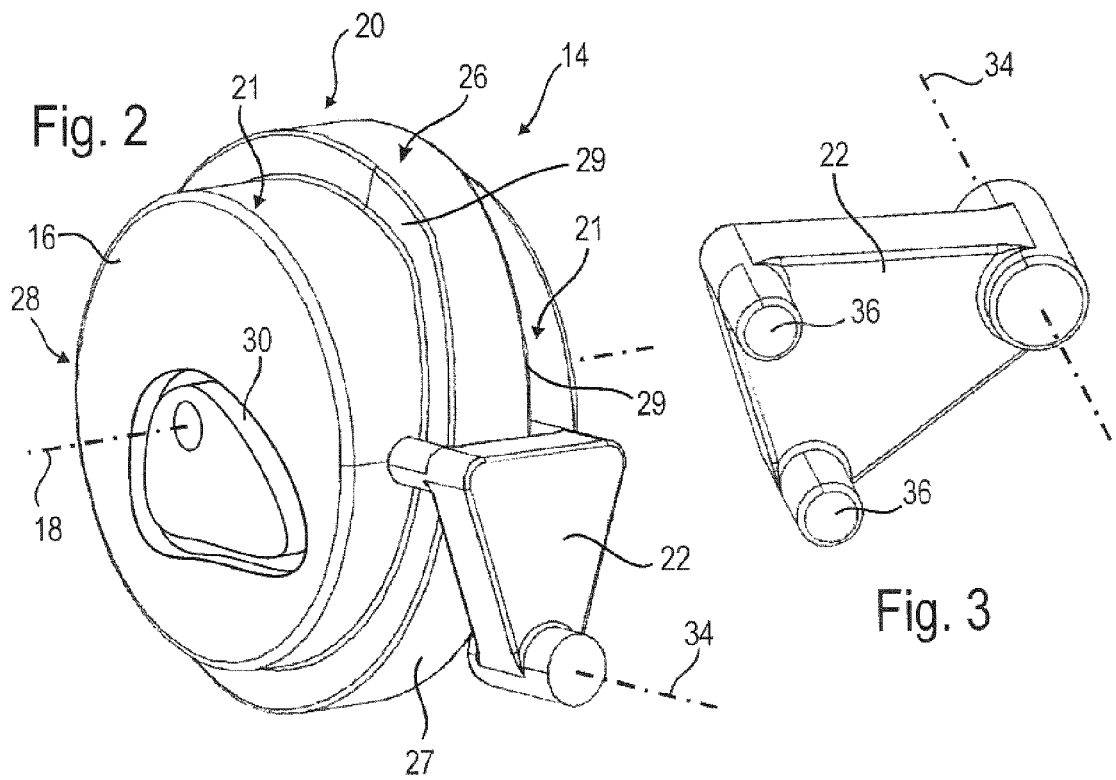
Fig. 2
Fig. 3

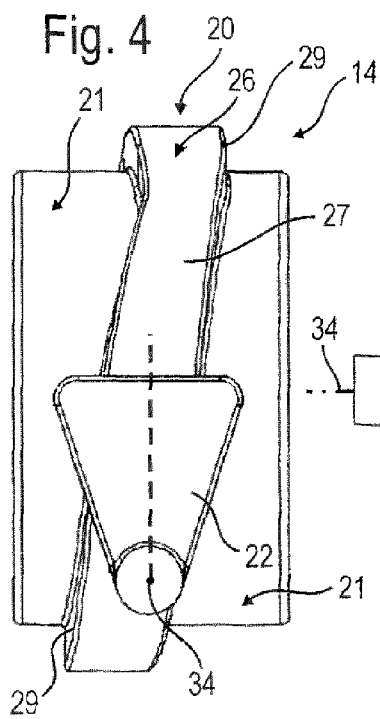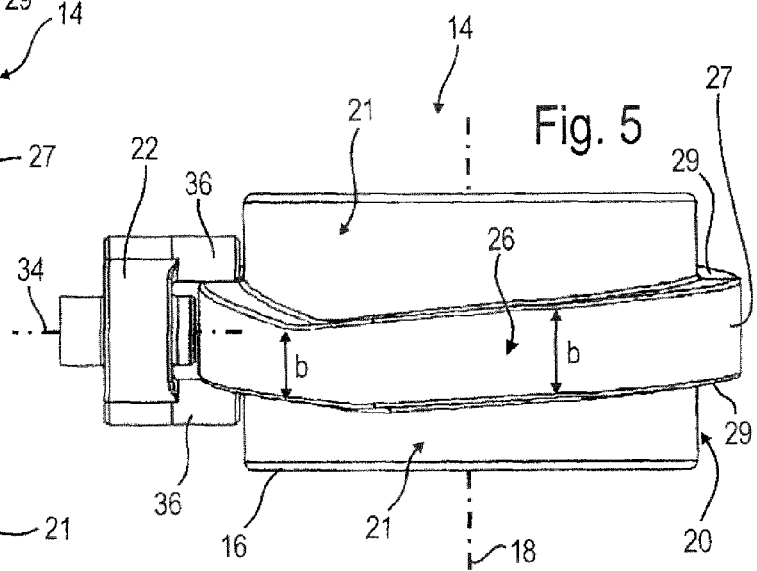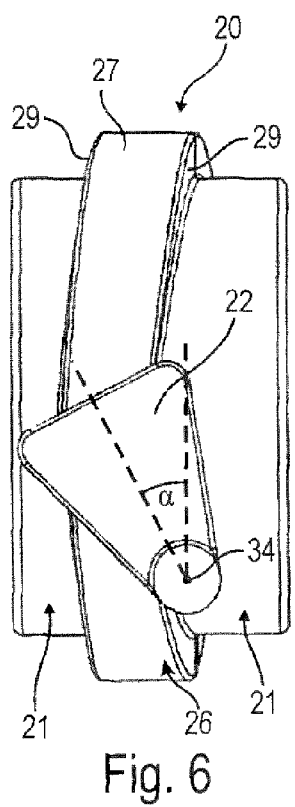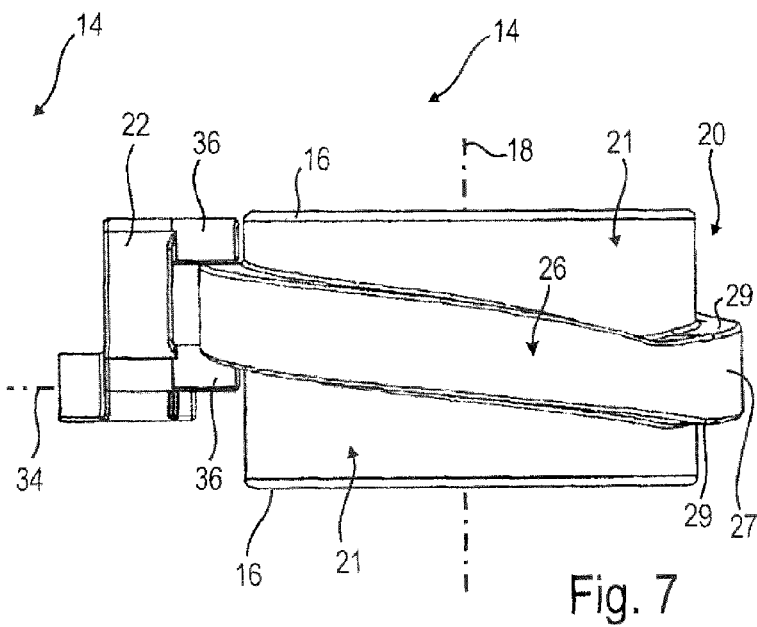

CONTROL ELEMENT OF A VEHICLE VENTILATION AND/OR AIR CONDITIONING UNIT, CONTROL ASSEMBLY AND VEHICLE VENTILATION AND/OR AIR CONDITIONING UNIT

RELATED APPLICATIONS

This application is the National Stage of International Patent Application No. PCT/EP2013/057967, filed on Apr. 14, 2013, which claims priority to and all the advantages of German Patent Application No. 10 2012 007 745.9, filed on Apr. 18, 2012, the content of which is incorporated herein by reference.

The invention relates to a control element of a vehicle ventilation and/or air conditioning unit, in particular for controlling air distribution flaps, with a rotational axis and a circumferential surface encircling around the rotational axis. The invention furthermore relates to a control assembly of at least one air distribution flap of a vehicle ventilation and/or air conditioning unit and to a vehicle ventilation and/or air conditioning unit.

Air distribution flaps of a vehicle ventilation and/or air conditioning unit control the air flow within the vehicle ventilation and/or air conditioning unit, for example the air flow to air cooling and heating elements or the air flow through air outflow openings of an air mixing and distribution chamber, said air outflow openings leading to various ventilation ducts in the vehicle.

On an encircling circumferential surface of a control element, known control assemblies for air distribution flaps have a groove in which an output element controlled by the control element can engage. The groove in the circumferential surface forms, as seen in the axial direction, an undercut which leads to a complicated production process for which, for example, a mould having movable mould parts is required.

It is the object of the invention to provide a control element of a vehicle ventilation and/or air conditioning unit for controlling air distribution flaps, which control element can be produced in a simple and cost-effective manner, and also to provide a corresponding control assembly and vehicle ventilation and/or air conditioning unit.

This object is achieved according to the invention by a control element of the type in question, wherein on the encircling circumferential surface the control element has at least one guiding rib which protrudes in the radial direction in relation to the circumferential surface and divides the control element into an axially front region and an axially rear region. In contrast to a groove directed inwards in the radial direction, a guiding rib which protrudes in the radial direction does not form an undercut per se and can therefore be produced in a simple manner. The control element is therefore in the shape of a drum with a rib protruding on the circumference.

The control element is preferably formed integrally. In this manner, no installation steps for different components are required during the production of the control element.

Advantageously, the axially front region and the axially rear region are in each case formed in the axial direction without an undercut, as seen from the associated axial end of the particular region. The control element can therefore be manufactured in a simple manner, for example by a mould having two mould halves which are arranged in the axial direction with respect to each other and are each without an undercut and are assigned to the two axial regions of the control element.

In order to be able to control a plurality of output elements independently, at least one axial end surface is provided, for example, said end surface having at least one guiding geometry, in particular a slotted guide. In addition to the guiding rib on the circumferential surface, a second guiding geometry is therefore provided on an axial end surface. The different spatial arrangement enables the construction space required by the output elements, which are controlled by the control element, to be separated.

The guide rib can extend in a closed manner along the entire circumference of the control element. The control element can therefore permit a continuous cyclic control.

The circumferential surface can be formed cylindrically, preferably circularly cylindrically.

Easy construction and cost-effective production are made possible by the control element being made of plastic.

For example, the control element can be an injection-moulded composite, wherein the separating surface of the injection-moulded composite runs in the guiding rib.

The guiding rib can have a constant width in the axial direction. This permits a simple embodiment and is advantageous in particular if an output element which is movable linearly in the axial direction is intended to be guided by the guiding rib.

Alternatively, the guiding rib can have a varying width in the axial direction, in particular wherein the width of the guiding rib is dependent on the axial position of the guiding rib. The guiding rib can thereby be optimally formed for play-free guidance of an output element. This is of advantage in particular if an output element which is rotatable about an axis of rotation is intended to be guided by the guiding rib.

The object is furthermore achieved by a control assembly of at least one air distribution flap of a vehicle ventilation and/or air conditioning unit, with an above-described control element and at least one output element which is coupled to the at least one guiding rib of the control element.

For example, the output element can be a lever which is mounted rotatably about a fulcrum and acts on the guiding rib of the control element, wherein a change in the axial position of the guiding rib causes a rotation of the lever.

The output element can have at least one cam which is in contact with the guiding rib.

An optimum coupling between the output element and control element is made possible by the output element having two cams between which the guiding rib is arranged.

The friction between the control element and output element is reduced by the cams being formed rotatably. For example, the cams can be mounted rotatably or can comprise rotatable sleeves such that the cams can roll laterally along the guiding rib.

At least one further output element is preferably provided, said output element being coupled to a guiding element on an axial end surface of the control element. The two output elements can therefore be controlled independently of each other via the guiding rib or the guiding geometry on the axial end surface. Owing to the different geometrical arrangements on the end surface, on the one hand, and the circumferential surface, on the other hand, the output elements can adopt a multiplicity of positions without obstructing one another.

The invention furthermore comprises a vehicle ventilation and/or air conditioning unit with an above-described control element and/or an above-described control assembly.

Further features and advantages of the invention emerge from the description below and from the drawings, to which reference is made. In the figures:

FIG. 1 shows a detailed view of a vehicle air conditioning unit according to the invention with a control assembly according to the invention for two air distribution flaps;

FIG. 2 shows a perspective view of a control assembly according to the invention of the vehicle air conditioning unit according to FIG. 1;

FIG. 3 shows a perspective view of the output element of the control assembly from FIG. 2;

FIG. 4 shows a lateral view of the control assembly from FIG. 2 in a first state;

FIG. 5 shows a top view of the control assembly from FIG. 2 in the first state;

FIG. 6 shows a lateral view of the control assembly from FIG. 2 in a second state;

FIG. 7 shows a top view of the control assembly from FIG. 2 in the second state.

Figure 8:
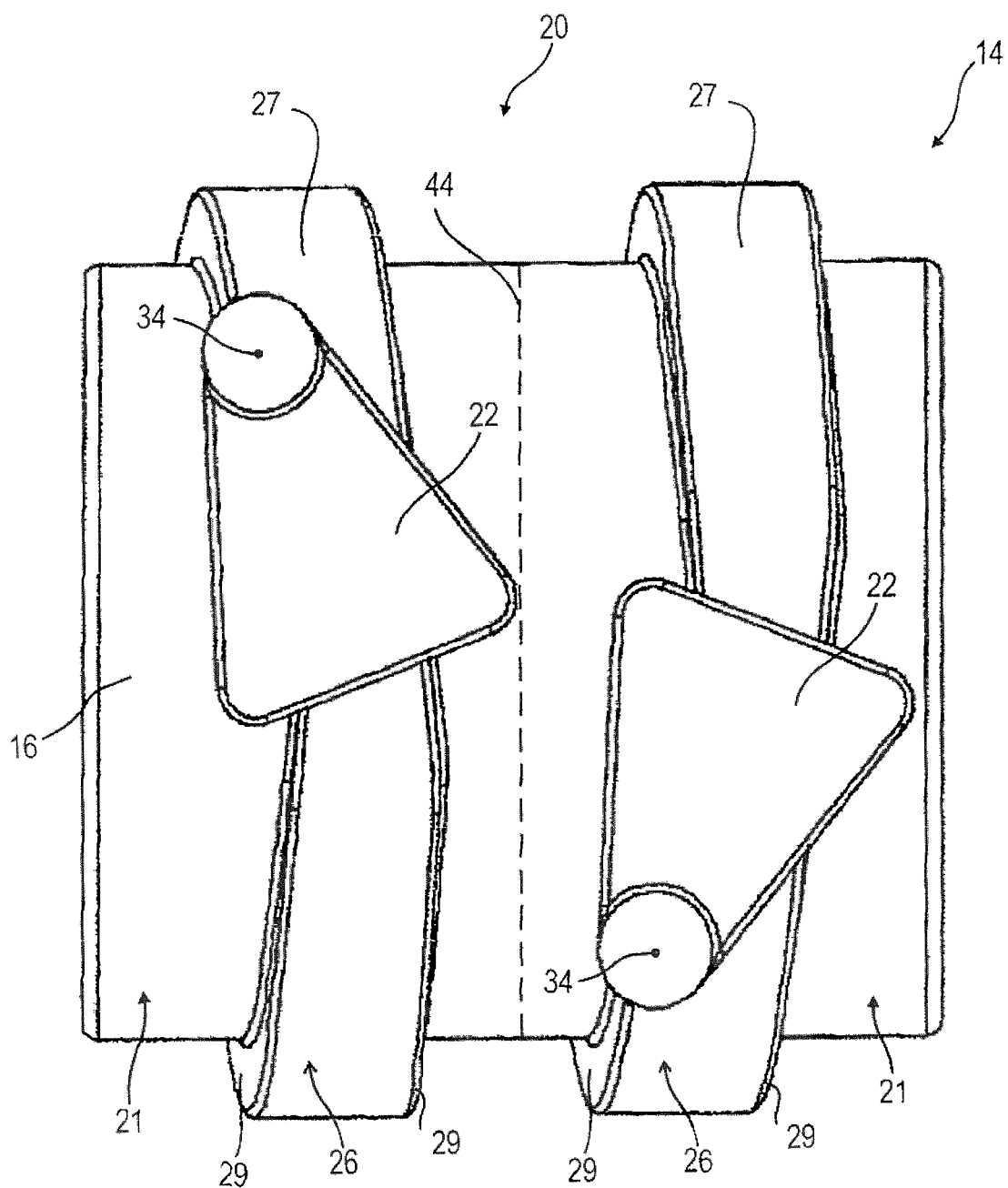
FIG. 8 shows a further embodiment of a control element according to the invention.

FIG. 1 shows a detailed view of a vehicle ventilation and/or air conditioning unit 10, vehicle air conditioning unit 10 in short below, with two air distribution flaps 12. The two air distribution flaps 12 are activated by a control assembly 14. It is also possible for the control assembly 14 to control only one air distribution flap 12 or more than two air distribution flaps 12. However, the control assembly 14 is advantageously formed compactly and can control a plurality of air distribution flaps 12, since the available construction space in vehicle air conditioning units is customarily limited.

The control assembly 14 comprises a single-piece control element 16 with a rotational axis 18 and a circumferential surface 20 encircling around the rotational axis 18, and also two output elements 22, 24 which are coupled to the control element 16 and are controlled by the control element 16. The control element 16 can be rotated about the rotational axis 18 thereof by a drive (not shown).

It is also possible for the control element 16 to be constructed in a manner assembled from a plurality of components. In particular, the control elements 16 can be constructed in a modular manner, and therefore a plurality of control elements as modules can be connected to form a common control element.

The two air distribution flaps 12 are each assigned an output element 22, 24. The air distribution flaps 12 are coupled to the particular output element 22, 24 directly in a form-fitting manner. It is also possible for the output elements 22, 24 to be coupled to the air distribution flaps via gearings. Alternatively, the output elements 22, 24 can also be formed directly on the air distribution flaps 12.

In the embodiment shown, the control element 16 has a substantially circular cylindrical shape with two axial end surfaces 28 and a circular cylindrical surface area which forms the circumferential surface 20. However, it is also possible for the control element 16 to have a general cylindrical shape or to be formed, for example, in the shape of a cone or truncated cone.

On the encircling circumferential surface 20, the control element 16 has a guiding rib 26 which protrudes in the radial direction in relation to the circumferential surface 20. The guiding rib has axial side surfaces 29 and an upper circumferential surface 27. The guiding rib has a width b in the axial direction, said width corresponding to the interval between the two axial side surfaces 29 in the axial direction (cf. FIG. 5).

The guiding rib 26 divides the circumferential surface in the axial direction into two spaced border surfaces 21 which lie between the axial side surfaces 29 of the guiding rib 26 and the axial end surfaces 28 of the control element 16.

The guiding rib 26 divides the integral control element 16 into an axially front region 40 and an axially rear region 42 (see FIG. 1). The axially front region and the axially rear region 40, 42 are each formed in the axial direction without an undercut, as seen from the facing axial ends of the particular region.

The guiding rib 26 extends in a closed manner along the entire circumference of the control element 16. An endless cyclic control is therefore made possible.

Alternatively, it is possible for the guiding rib 26 not to be closed and to extend, for example, only in sections along the circumference of the control element 16. It is also possible to provide a plurality of guiding ribs 26 which extend, preferably in different sections, along the circumference of the control element 16.

FIG. 2 shows a perspective view of the control assembly 14 with the control element 16 and the first output element 22, wherein the axial end surface 28, which faces forwards in FIG. 2, corresponds to the axial end surface 28 assigned to the air distribution flap 12. For the sake of clarity, the second output element 24 is not shown in FIG. 2.

A guiding geometry 30 in the form of a slotted guide is provided on the axial end surface 28. The slotted guide is formed on the axial end surface 28 of the integral control element and is therefore formed in the axial direction without an undercut, as seen from the facing axial ends of the particular axial region of the control element 16.

It is also possible for a plurality of guiding geometries 30 to be provided on the axial end surface. The various guiding geometries can run separately from one another or can intersect one another. Furthermore, a plurality of output elements 24 can also be provided, said output elements being coupled to the same or different guiding geometries 30.

As is apparent in FIG. 1, the second output element 24 engages with a guiding extension 32 in the guiding geometry 30 on the axial end surface 28 of the control element 16.

If the control element 16 is rotated, the guiding extension 32 is moved at the same time by the guiding geometry 30, and therefore a force and movement from the control element 16 is transmitted to the output element 24 and from the latter to the associated air distribution flap 12.

In the embodiment shown, the output element 24 is in the form of a lever which transmits a rotational movement to the air distribution flap 12.

The guiding geometry 30 is formed by a guide slot running in a closed manner, wherein each angular position of the control element 16 is assigned a certain angular position of the corresponding air distribution flap 12 and an endless cyclic control is possible.

Alternatively, the guiding geometry 30 can also run in a non-closed manner. For example, the guiding geometry 30 can be formed by a guide slot running linearly.

As an alternative to a cyclic control, in which the control element is rotated, for example continuously, in one direction of rotation, a non-cyclic, i.e. reversing control can also be provided, in which the control element is rotated in an alternating manner, for example within a certain angular range, in both directions of rotation.

The first output element 22 is shown in a detailed view in FIG. 3. The output element 22 is mounted rotatably about a rotational axis 34 and is in the form of a lever.

At the end of the lever arm, the output element 22 has two cams 36 between which the guiding rib 26 can be accommodated. The two cams 36 engage around the guiding rib 26 and bear in each case against the axial side surfaces 29 of the guiding rib 26. The interval, which is defined by the border surfaces 21, between the side surfaces 29 of the guiding rib 26 and the axial end surfaces 28 of the control element 16 corresponds at least to the diameter of the cams 36 of the output element 22.

However, it is also possible for the interval defined by the border surfaces 21 to be greater or smaller than the diameter of the cams 36 of the output element 22.

The lever arm of the output element 22 is arranged in a tangential plane with respect to the control element 16, wherein the rotational axis 34 of the output element 22 is arranged in a plane perpendicular to the rotational axis 18 of the control element.

In the embodiment shown, the output element 22 is formed in a single piece and is produced, for example, without an undercut by injection moulding. Alternatively, the output element 22 can also be formed assembled from two or more components.

It is also possible for the cams 36 to be formed rotatably. For this purpose, for example, rotatable sleeves can be provided on the cams, or the cams can be mounted rotatably on the lever arm of the output element 22. The cams can thereby roll along the guiding rib 26, and the friction between control element 16 and output element 22 is reduced.

Upon rotation of the control element 16 about the rotational axis 18, a force and movement is transmitted via the guiding rib 26 to the output element 22 and the associated air distribution flap 12. The output element 22 which is in the form of a lever takes up different angular positions in the axial direction corresponding to the profile of the guiding rib 26 on the circumferential surface 20. In the embodiment shown, a rotational movement is therefore transmitted to the output element 22 and to the air distribution flap 12 which is connected thereto.

Alternatively, embodiments are possible, in which a linearly movable output element 22 is provided, said output element converting a rotational movement of the control element 16 into a linear movement of an output element 22.

The control element 16 is manufactured integrally from plastic by injection moulding and, firstly, can be produced in a simple and cost-effective manner and, secondly, has a low weight. By means of the undercut-free formation of the axially front region and axially rear region 40, 42 by means of the guiding rib 26, it is possible to manufacture the control element 16 by a simple injection mould which does not require any movable parts, such as sliders. Each of the two halves of an injection mould are assigned to the axially front region or to the axially rear region 40, 42 of the control element 16.

A separating surface 25 of the injection-moulded composite and of the injection mould runs in the guiding rib 26 and is indicated by a dotted line in FIG. 1. The two moulds of the injection mould therefore meet in the separating surface in the region of the guiding rib 26. The separating surface 25 can be formed in an even or uneven manner.

In the embodiment shown, the separating surface lies in a plane perpendicular to the rotational axis 18 of the control element. However, it is also possible for the separating surface 25 to lie in a different plane or to be formed unevenly, for example along the central line of the guiding rib 26 or one of the side surfaces of the guiding rib 26.

In the illustration shown, the integral control element 16 is shown in the form of a solid composite. However, it is also possible for the integral control element 16 to be manufactured in a lightweight construction, for example in a skeleton construction.

The function of the control assembly 14 is explained below with reference to FIGS. 4 to 7.

FIGS. 4 and 5 show the control assembly 14 with the control element 16 and the output element 22 in a first state from a lateral view and in a top view. In the first state of the control assembly 14, the cams 36 of the output element 22 act on a first circumferential position of the control element 16 on the guiding rib 26. In the first circumferential position of the control element 16, the guiding rib 26 is arranged axially centrally on the circumferential surface 20 of the control element 16. The lever arm of the output element 22 is accordingly in a first central angular position, which is shown by the dashed line.

FIGS. 6 and 7 show the control assembly 14 in the views corresponding to FIGS. 4 and 5, wherein the control assembly 14 is in a second state in which the control element 16 is rotated through approx. 90° about the rotational axis 18 in relation to the first state. The cams 36 of the output element 22 act on a second circumferential position of the control element 16 on the guiding rib 26 which, at the second circumferential position, is arranged axially on the border side of the circumferential surface 20 of the control element 16. In this position, the lever arm of the output element is rotated through the angle α in relation to the position shown in FIG. 4.

When the output element 22 which is in the form of a lever is rotated about the rotational axis 34 thereof, the effective interval between the two cams 36 in the axial direction changes. In order to achieve optimum engagement of the output element 22 with the two cams 36 on both sides of the guiding rib 26 at a different effective interval between the cams 36, the width b of the guiding rib 26 in the axial direction changes depending on the axial position of the guiding rib 26.

The varying width b of the guiding rib therefore permits play-free engagement of the output element 22 on the guiding rib 26.

Alternatively, it is also possible for the width b of the guiding rib 26 to be constant.

Furthermore, it is possible for the output element 22 to be in contact with an axial side surface 29 of the guiding rib.

It is also possible for further guiding geometries 30, in particular in the form of slotted guides, to be provided on one or both end surfaces 28. Alternatively, a connecting geometry permitting coupling to the drive can also be formed on one end surface.

FIG. 8 shows an alternative embodiment of a control element 16 which, on the circumferential surface 20 thereof, has two guiding ribs 26 arranged offset in the axial direction. An output element 22 is arranged on each guiding rib 26. The shape and function of the guiding ribs 26 and of the output elements 22 are in each case analogous to the embodiment shown previously.

The control element 16 can be in the form of a single piece or composed of two or more components. For example, the control element 16 could consist of two modules, as illustrated in FIG. 8, for example, by the line 44 which is shown in dashed form and symbolizes a separating or connecting surface. The two modules can each be formed analogously to the control element 16 of the first embodiment and are connected to each other via the axial end surfaces 28 thereof.

In all of the embodiments, it is also possible for a plurality of output elements 22 to be provided on a guiding rib 26 and/or a guiding geometry 30. For example, further output elements 22 can be arranged on the guiding rib 26 in a manner offset in the circumferential direction by a certain angle, for example by 180°, 90° or 60°.

The invention claimed is:

1. A vehicle ventilation and/or air conditioning unit with a control element including a rotational axis and a circumferential surface encircling the rotational axis, with the control element having at least one guiding rib on the circumferential surface which protrudes in a radial direction in relation to the circumferential surface and divides the control element into an axially front region and an axially rear region, wherein the control element has an axial direction along the rotational axis and the width of the at least one guiding rib in the axial direction changes throughout the radial direction of the circumferential surface, and wherein the at least one guiding rib extends in a closed manner along the entire circumferential surface of the control element.

2. A control element of a vehicle ventilation and/or air conditioning unit (10) for controlling air distribution flaps (12), the control element includes a rotational axis and a circumferential surface encircling the rotational axis, with the control element having at least one guiding rib on the circumferential surface which protrudes in a radial direction in relation to the circumferential surface and divides the control element into an axially front region and an axially rear region, wherein the control element has an axial direction along the rotational axis and the width of the at least one guiding rib in the axial direction changes throughout the radial direction of the circumferential surface, and wherein the at least one guiding rib extends in a closed manner along the entire circumferential surface of the control element.

3. A control element according to claim 2, wherein the control element is formed integrally.

4. A control element according to claim 2, wherein the axially front region and the axially rear region are each formed in the axial direction without an undercut, as seen from an associated axial end of the axially front region or the axially rear region.

5. A control element according to claim 2, wherein at least one axial end surface is provided with at least one guiding geometry.

6. A control element according to claim 2, wherein the circumferential surface is formed cylindrically.

7. A control element according to claim 2, wherein the control element is an injection-moulded composite having a separating surface running in the at least one guiding rib.

8. A control assembly of at least one air distribution flap of a vehicle ventilation and/or air conditioning unit (10), with a control element including a rotational axis and a circumferential surface encircling the rotational axis, with the control element having at least one guiding rib on the circumferential surface which protrudes in a radial direction in relation to the circumferential surface and divides the control element into an axially front region and an axially rear region, wherein the control element has an axial direction along the rotational axis and the width of the at least one guiding rib in the axial direction changes throughout the radial direction of the circumferential surface, wherein the at least one guiding rib extends in a closed manner along the entire circumferential surface of the control element, and wherein the vehicle ventilation and/or air conditioning unit (10) further includes at least one first output element which is coupled to the at least one guiding rib of the control element.

9. A control assembly according to claim 8, wherein the at least one first output element is a lever which is mounted rotatably about a fulcrum and acts on the at least one guiding rib of the control element (16), wherein a change in the axial position of the at least one guiding rib causes a rotation of the lever.

10. A control assembly according to claim 8, wherein the at least one first output element has at least one cam which is in contact with the at least one guiding rib.

11. A control assembly according to claim 10, wherein the at least one cam is configured to rotate.

12. A control assembly according to claim 8, wherein the at least one first output element has two cams between which the at least one guiding rib is arranged.

13. A control assembly according to claim 8, wherein at least one second output element is provided, with the second output element being coupled to a guiding geometry on an axial end surface of the control element (16).

* * * * *